US007950510B2

(12) United States Patent
Marsh et al.

(10) Patent No.: US 7,950,510 B2
(45) Date of Patent: May 31, 2011

(54) TORQUE TRANSFER DEVICE WITH TORQUE LIMITING MECHANISM

(75) Inventors: Gregory A. Marsh, Ferndale, MI (US); Zugang Huang, Troy, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 970 days.

(21) Appl. No.: 11/832,420

(22) Filed: Aug. 1, 2007

(65) Prior Publication Data
US 2009/0032354 A1  Feb. 5, 2009

(51) Int. Cl.
*F16D 13/04* (2006.01)
*F16D 13/26* (2006.01)

(52) U.S. Cl. ......... 192/54.51; 192/66.2; 192/70; 192/94
(58) Field of Classification Search .............. 192/54.2, 192/54.51, 66.2, 70, 94; 188/134
See application file for complete search history.

(56) References Cited

U.S. PATENT DOCUMENTS

| | | | |
|---|---|---|---|
| 834,574 A * | 10/1906 | Haynes | .......................... 192/50 |
| 1,810,494 A | 6/1931 | Murray | |
| 2,175,383 A * | 10/1939 | Eason | ........................ 192/18 R |
| 2,229,753 A | 1/1941 | LeTourneau | |
| 2,229,754 A | 1/1941 | LeTourneau | |
| 2,339,643 A | 1/1944 | LeTourneau | |
| 2,364,019 A * | 11/1944 | Beall | .......................... 192/54.51 |
| 3,463,281 A * | 8/1969 | Aschauer | ........................ 192/57 |
| 3,567,000 A | 3/1971 | Richards | |
| 3,570,316 A | 3/1971 | Hornack et al. | |
| 3,901,092 A | 8/1975 | Romick | |
| 3,904,004 A | 9/1975 | Marx | |
| 3,915,032 A | 10/1975 | Ottemann | |
| 3,916,728 A | 11/1975 | Behar et al. | |
| 3,929,200 A | 12/1975 | Behar | |
| 4,050,328 A | 9/1977 | Romick | |
| 4,397,198 A | 8/1983 | Borgersen et al. | |
| 4,400,996 A | 8/1983 | Schou | |
| 4,623,054 A | 11/1986 | Barksdale | |
| 5,022,506 A | 6/1991 | Philippe | |
| 5,135,087 A | 8/1992 | Frost | |
| 5,397,269 A | 3/1995 | Beaty et al. | |
| 6,076,644 A | 6/2000 | Forrest et al. | |
| 6,155,395 A | 12/2000 | Braford, Jr. | |
| 6,261,202 B1 | 7/2001 | Forrest et al. | |
| 6,467,597 B1 | 10/2002 | Fernandez | |
| 6,588,561 B1 | 7/2003 | Fernandez | |
| 7,364,524 B2 * | 4/2008 | Marsh et al. | ...................... 475/5 |

* cited by examiner

*Primary Examiner* — David D Le
*Assistant Examiner* — Terry Chau
(74) *Attorney, Agent, or Firm* — Harness, Dickey & Pierce, P.L.C.

(57) ABSTRACT

An overrunning torque transmitting device that employs a plurality of cone clutches and an overload mechanism for limiting the torque transmitted through the device in a predetermined rotational direction. A method for transmitting torque is also provided.

20 Claims, 7 Drawing Sheets

TORQUE TRANSFER DEVICE WITH TORQUE LIMITING MECHANISM

INTRODUCTION

The present invention generally relates to torque transfer devices, such as torque transfer devices found in vehicle drivelines. More particularly, the present invention relates to a torque transfer device having a torque-limited, two-way overrunning cone clutch.

U.S. Pat. No. 3,567,000 discloses a clutch coupling for transmitting torque between a power shaft and a drive shaft that employs a pair of single cone clutches to transmit power in two rotary directions between a power shaft and a drive shaft.

U.S. Pat. No. 4,397,198 discloses a cone clutch arrangement that is employed to reverse the rotational direction of power transmitted through a device.

U.S. Pat. No. 4,400,996 discloses a differential assembly that employs a pair of single cone clutches and a center driving ring to control the distribution of rotary power from a differential case to a pair of output shafts.

U.S. Pat. No. 3,904,004 discloses a freewheeling overrunning clutch that employs a pair of single cone clutches to transmit power in two rotary directions.

SUMMARY

In one form, the present teachings provide a vehicle driveline that includes a first driveline component, a second driveline component and a torque transmitting device. The torque transmitting device has an input portion, an output portion, first and second cone clutch surfaces and first and second mating cone clutch surfaces. The input portion has a shaft with a thread formed thereon. The input portion is coupled for rotation with a rotatable power transmitting member of the first driveline component. The output portion is coupled for rotation with a rotatable power transmitting member of the second driveline component. The output portion has a first case member, a second case member and an overload spring. The first case member is axially slidably but non-rotatably mounted on the second case member. The overload spring biases the first and second case members toward one another. The first and second cone clutch surfaces are mounted on the thread on the shaft of the input portion. The first and second mating cone clutch surfaces are received between the first case member and the second case member. At least one of the first and second mating cone clutch surfaces is axially slidably but non-rotatably coupled to the second case member.

In another form, the present teachings provide a method for transmitting torque through a vehicle driveline. The method includes: providing a torque transmitting device having a threaded shaft, a first and second cone clutch members, a housing, and first and second cone clutch members, the first and second cone clutch members being threadably received on the threaded shaft, the housing including a first housing member and a second housing member, the first housing member being axially slidably but non-rotatably coupled to the second housing member, a portion of the first and second mating cone clutch members being axially slidably but non-rotatably coupled to the second housing member; biasing the first housing member toward the second housing member; rotating the threaded shaft relative to the first cone clutch member in a first rotational direction to drive the first cone clutch member against the first mating cone clutch member; and continuing rotation of the threaded shaft relative to the first cone clutch member in the first rotational direction to axially move the threaded shaft to cause the second cone clutch member to engage the second mating cone clutch member.

In yet another form, the present teachings provide a torque transmitting device that includes an input portion, an output portion, first and second cone clutch surfaces, and first and second mating cone clutch surfaces. The input portion has a shaft with a thread formed thereon. The input portion is configured to be coupled for rotation with a rotatable power transmitting member of a first driveline component. The output portion is configured to be coupled for rotation with a rotatable power transmitting member of a second driveline component. The output portion has a first case member, a second case member and an overload spring, the first case member is axially slidably but non-rotatably mounted on the second case member, the overload spring biases the first and second case members toward one another. The first and second cone clutch surfaces are mounted on the thread on the shaft of the input portion. The first and second mating cone clutch surfaces received between the first case member and the second case member. At least one of the first and second mating cone clutch surfaces is axially slidably but non-rotatably coupled to the second case member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
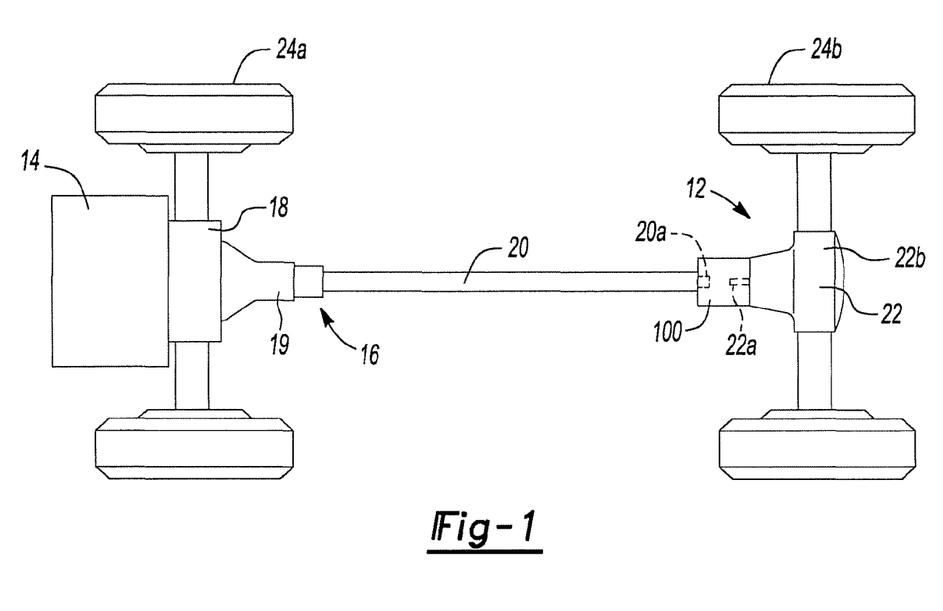
FIG. 1 is a schematic illustration of an exemplary vehicle constructed in accordance with the teachings of the present disclosure.

With reference to FIG. 1 of the drawings, an exemplary vehicle constructed in accordance with the teachings of the present disclosure is generally indicated by reference numeral 10. The vehicle 10 can include an engine 14 and a drive line 16. The drive line 16 can include a transmission 18, a power take off 19, a propshaft assembly 20, a rear axle 22 and a plurality of wheels 24. The engine 14 can produce rotary power that can be transmitted to the transmission 18 in a conventional and well known manner. The transmission 18 can be conventionally configured to drive the front wheels 24a and can include a transmission output shaft 18a that can provide power to the power take off 19. The propshaft assembly 20 can be coupled for rotation with an output of the power take off 19 to permit drive torque to be transmitted from the power take off 19 to the rear axle 22 where can be selectively apportioned in a predetermined manner to the rear wheels 24b.

It will be appreciated that while the vehicle in the particular example provided employs a drive line with an all-wheel drive arrangement, the teachings of the present disclosure have broader applicability. In this regard, a shaft assembly constructed in accordance with the teachings of the present disclosure may interconnect a first drive line component with a second drive line component to transmit torque therebetween. In the context of an automotive vehicle, the drive line components could be a transmission, a transfer case, a power take off, a viscous coupling, an axle assembly, or a differential, for example.

A torque transfer device 100 constructed in accordance with the teachings of the present disclosure can be employed to transmit rotary power between a first driveline component and a second driveline component. In the example provided, the first driveline component is the prop shaft 20 and the second driveline component is the rear axle 22. More specifically, the torque transfer device 100 transmits rotary power from an output member 20a of the propshaft 20 to an input member 22a (e.g., an input pinion) of the rear axle 22.

Figure 2:
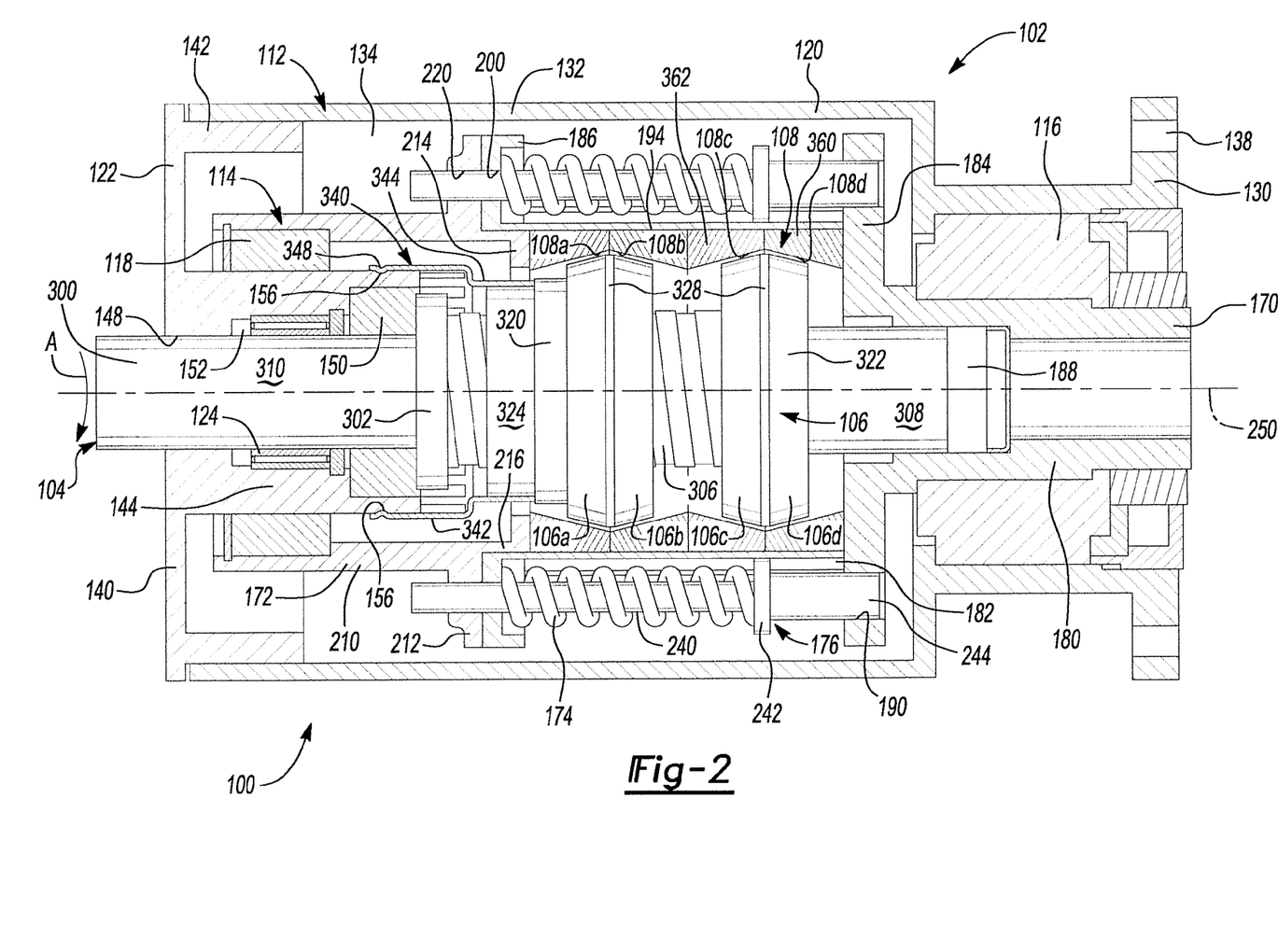
FIG. 2 is a section view of a portion of the vehicle of FIG. 1 illustrating a torque transfer device in more detail.

With reference to FIG. 2, the torque transfer device 100 can include a first portion 102, a second portion 104, a plurality of cone clutch surfaces 106 and a plurality of mating cone clutch surfaces 108. The first portion 102 can include an exterior housing assembly 112, an interior housing assembly 114, and first and second bearings 116 and 118. The exterior housing assembly 112 can include a first exterior housing member 120, a second exterior housing member 122 and a bearing 124. In the example provided, the first exterior housing member 120 includes a mounting flange 130 and a container-like body 132 that defines an interior cavity 134 into which the second portion 104 of the torque transfer device 100 can be received. The mounting flange 130 can include a plurality of circumferentially spaced-apart mounting holes 138 that can permit the first exterior housing member 120 to be non-rotatably coupled to a driveline component, such as a housing 22b (FIG. 1) of the rear axle 22 (FIG. 1).

The second exterior housing member 122 can include a plate member 140, which can be employed to close off an open end of the body 132, an annular outer rim 142 and a hub 144. The annular outer rim 142 can be employed to center the second exterior housing member 122 relative to the first exterior housing member 120 and/or to removably couple the second exterior housing member 122 to the first exterior housing member 120. For example, the annular outer rim 142 can be threadably engaged to the body 132 of the first exterior housing member 120. The hub 144 can project from the plate member 140 into the interior cavity 134 can define a through bore 148. First and second counterbores 150 and 152 can be formed into the hub 144 on a side opposite the plate member 140 concentric with the through bore 148. The first counterbore 150 can have a first internal diameter and can extend into the hub 144 by a first distance. The second counterbore 152 can have a second internal diameter that can be smaller than the first internal diameter and the second counterbore 152 can extend into the hub by a second distance that is greater than the first distance. A circumferentially extending groove 156 can be formed about the circumference of the hub 144. The bearing 124 can be received in the second counterbore 152.

The interior housing assembly 114 can include a first interior housing member 170, a second interior housing member 172, a plurality of springs 174 and a plurality of spring pins 176.

The first interior housing member 170 can includes a shaft structure 180, an annular body 182, a first flange 184 and a second flange 186. A counterbore 188 can be formed in the shaft structure 180. The first flange 184 can extend radially outwardly from the shaft structure 180 and can interconnect the shaft structure 180 and the annular body 182. A plurality of circumferentially spaced-apart guide holes 190 can be formed into or through the first flange 184 at a location radially outward of the annular body 182. The annular body 182 can extend between the first and second flanges 184 and 186 and can include an interior splined surface 194 with a plurality of circumferentially spaced-apart, longitudinally extending internal splines (not specifically shown). The second flange 186 can extend radially outwardly from the annular body 182 and can define a plurality of clearance holes 200. Each of the clearance holes 200 can be disposed in-line with a corresponding one of the guide holes 190.

The second interior housing member 172 can include a circumferentially extending body structure 210, a flange member 212 that extends radially outwardly from the body structure 210 and a circumferentially extending abutting member 214 that can extend radially inwardly from the body structure 210. A plurality of external longitudinally extending splines 216 can be formed about the circumference of the portion of the body structure 210 forwardly of the flange member 212; the external splines 216 are configured to matingly engage the longitudinally extending internal splines (not specifically shown) on the annular body 182 of the first interior housing member 170. A plurality of circumferentially spaced-apart anchor holes 220 can be formed in or through the flange member 212; the anchor holes 220 can be aligned with respective pairs of the clearance holes 200 and the guide holes 190.

The springs 174 can be compression springs that can be fitted over a portion of the spring pins 176. Each of the spring pins 176 can include a pin member 240, a pin flange 242 and a pin guide 244 and can be received in a corresponding set of anchor holes 220, clearance holes 200 and guide holes 190. More specifically, the pin guide 244 of each spring pin 176 can be received in a corresponding one of the guide holes 190, while its pin member 240 can be fitted through one of the springs 174, a corresponding clearance hole 200 and a corresponding anchor hole 220. The pin member 240 can be fixedly coupled (e.g., fixedly but removably coupled) to the flange member 212 of the second interior housing member 172 in any desired manner. For example, an end of the pin member 240 opposite the pin guide 244 can be threaded and can engage corresponding threads formed about the anchor hole 220. As another example, the end of the pin member 240 opposite the pin guide 244 can be press-fit into a corresponding anchor hole 220. The spring 174 can be compressed between the pin flange 242 and the second flange 186 and can drive the spring pin 176 in a direction toward the first flange 184 (i.e., to the right in the illustration of FIG. 2).

The first bearing 116 can be received in the interior cavity 134 and coupled to an interior surface of the first exterior housing member 120. The shaft structure 180 of the first interior housing member 170 can be fitted through (and journally supported by) the first bearing 116. The second bearing 118 can be mounted to the exterior of the hub 144 concentric with the bearing 124. The circumferentially extending body structure 210 can be fitted over (and journally supported by) the second bearing 118. Accordingly, it will be appreciated that the interior housing assembly 114 is supported by the first and second bearings 116 and 118 for rotation within the exterior housing assembly 112 about a rotational axis 250.

The second portion 104 can include a shaft member 300 and a stop member 302. The shaft member 300 can have a threaded portion 306 that can be disposed proximate a distal end segment 308. The threaded portion 306 can have a suitable thread form, such as an ACME thread form. The stop member 302 can be an annular member that can be non-rotatably coupled to the shaft member 300 on a side of the threaded portion 306 opposite the distal end segment 308. A proximal portion 310 of the shaft member 300 can be received through the through bore 148 in the hub 144, while the distal end segment 308 can be received in the counterbore 188 in the shaft structure 180. The bearing 124 can journally support the proximal portion 310 of the shaft member 300.

The plurality of cone clutch surfaces 106 include a first cone clutch surface 106a, a second cone clutch surface 106b, a third cone clutch surface 106c and a fourth cone clutch surface 106d. In the particular example provided, the first and second cone clutch surfaces 106a and 106b are co-formed on a nut 320 that is threadably engaged to the threaded portion 306 of the shaft member 300, while the third and fourth cone clutch surfaces 106c and 106d are co-formed on a structure 322 that is fixed (rotationally and axially) to the shaft member 300 between the threaded portion 306 and the distal end segment 308. The nut 320 can include a cylindrical drag surface 324.

As the third and fourth cone clutch surfaces 106c and 106d are generally similar to the first and second cone clutch surfaces 106a and 106b, respectively, only the first and second cone clutch surfaces 106a and 106b will be discussed in detail herein. The first cone clutch surface 106a can be frusto-conical and can diverge from the rotational axis 250 with decreasing distance to the second cone clutch surface 106b. The second cone clutch surface 106b can be a mirror image of the first cone clutch surface 106a (using a mirror plane taken perpendicularly through both the rotational axis 250 and a cone that defines the first cone clutch surface 106a). A flat land 328 can be disposed between the first and second cone clutch surfaces 106a and 106b.

A drag force can be applied to the nut 320 to facilitate relative rotation between the nut 320 and the shaft member 300. In the particular example provided, a drag spring 340 is employed to generate the drag force. The drag spring 340 can include an annular body 342 that can be mounted to the hub 144 and a plurality of cantilevered spring fingers 344 that can engage the cylindrical drag surface 324 on the nut 320. The annular body 342 can include a circumferentially extending rib 348 that can be received in the circumferentially extending groove 156 formed about the hub 144 to inhibit axial movement of the drag spring 340 relative to the hub 144.

The mating cone clutch surfaces 108 can include a first mating cone clutch surface 108a, a second mating cone clutch surface 108b, a third mating cone clutch surface 108c and a fourth mating cone clutch surface 108d. In the particular example provided, each of the mating cone clutch surfaces 108 is formed on an annular structure 360 that is non-rotatably but axially slidably mounted to the body of the first interior housing member 170. In this regard, the annular structures 360 include a plurality of axially extending splines 362 that matingly engage the interior splined 194 of the annular body 182. The structures 360 can be abutted against one another between the first flange 184 on the first interior housing member 170 and the abutting member 214 on the second interior housing member 172.

As the third and fourth mating cone clutch surfaces 108c and 108d are generally similar to the first and second mating cone clutch surfaces 108a and 108b, respectively, only the first and second mating cone clutch surfaces 108a and 108b will be discussed in detail herein. The first mating cone clutch surface 108a can be frusto-conical and can diverge from the rotational axis 250 with decreasing distance to the second mating cone clutch surface 108b. The second mating cone clutch surface 108b can be a mirror image of the first mating cone clutch surface 108a (using a mirror plane taken perpendicularly through both the rotational axis 250 and a cone that defines the first mating cone clutch surface 108a).

Figure 3:
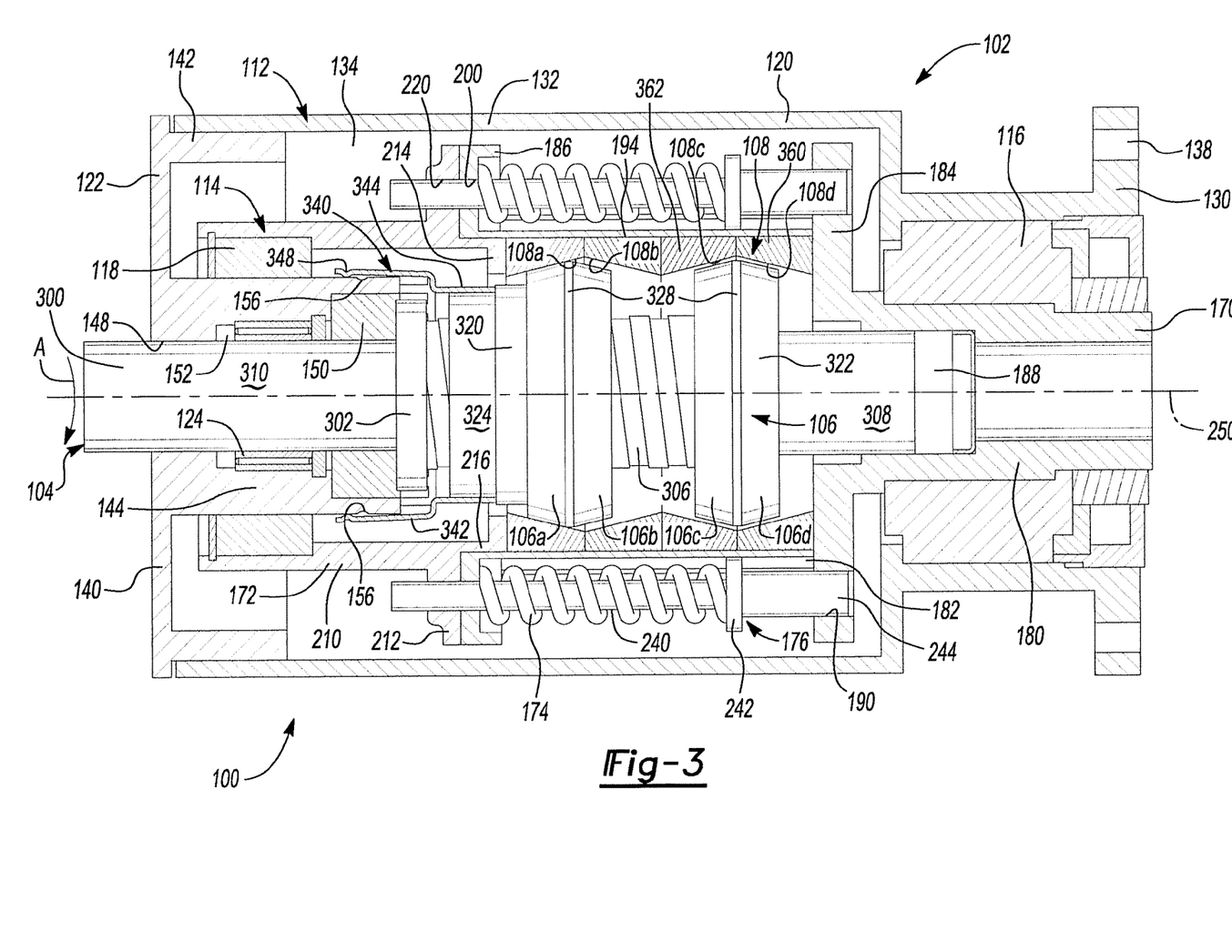
FIG. 3 is a section view similar to that of FIG. 2 but illustrating the torque transfer device in an intermediate configuration as power is applied in a first rotational direction as opposed to the neutral configuration of FIG. 2.
Figure 4:
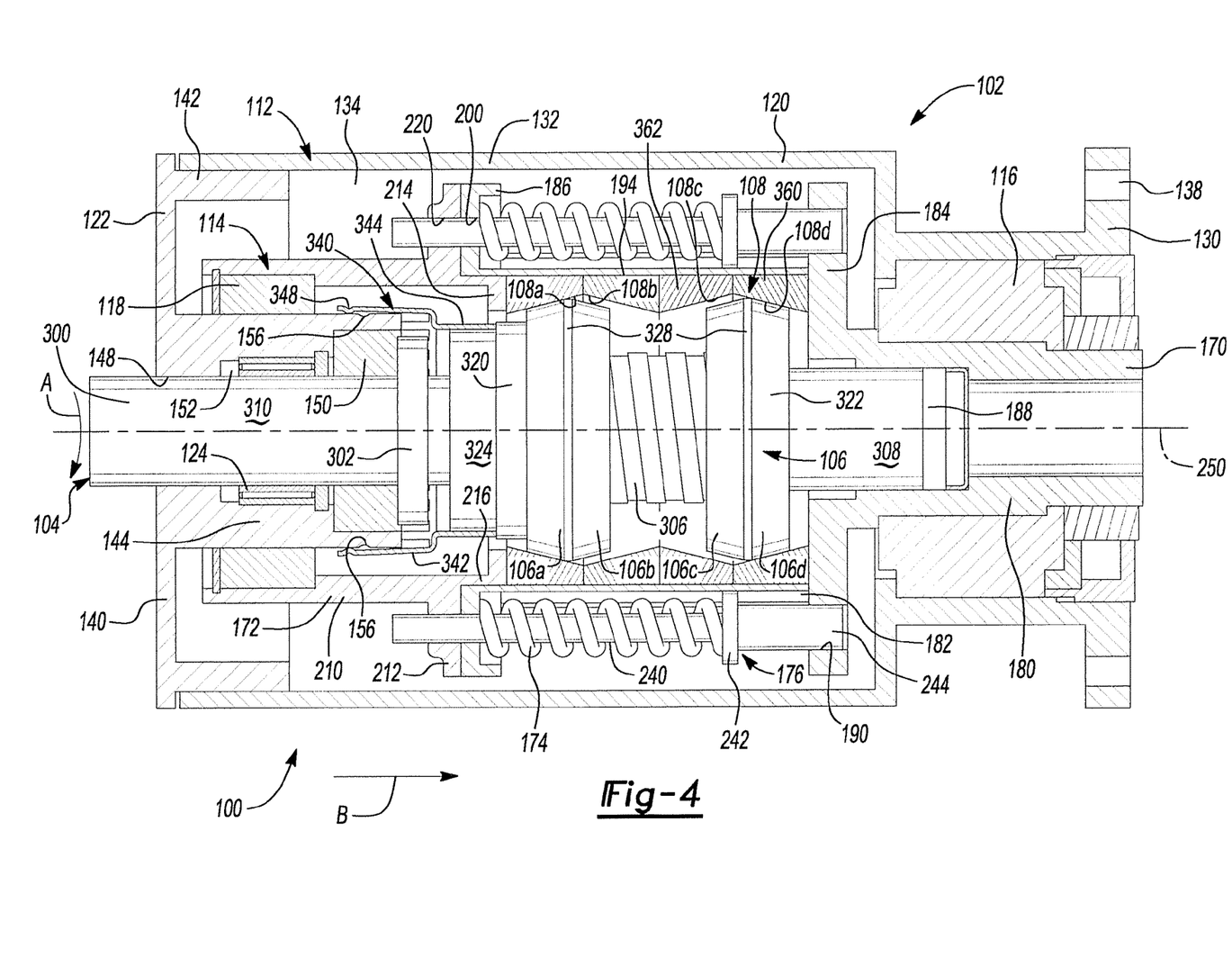
FIG. 4 is a section view similar to that of FIG. 3 but illustrating the torque transfer device in an engaged condition when power is applied in the first rotational direction.

In operation, the cone clutch surfaces 106 can be initially disengaged from the mating cone clutch surfaces 108 as shown in FIG. 2. Rotation of the shaft member 300 in a first rotational direction designated by arrow A (e.g., to propel the vehicle 10 (FIG. 1) in a forward direction) with the application of the drag force to the nut 320 causes the nut 320 to translate along the shaft member 300 to bring the first cone clutch surface 106a into contact with the first mating cone clutch surface 108 as shown in FIG. 3. Further rotation of the shaft member 300 in the first rotational direction causes the shaft member 300 to translate in the direction of arrow B (such that the distal end segment 308 of the shaft member 300 is further received in the counterbore 188) to urge the fourth cone clutch surface 106d into engagement fourth mating cone clutch surface 108d as shown in FIG. 4. In this condition, rotary power can be transmitted in the first rotational direction between the shaft member 300 and the interior housing assembly 114 (via the first and fourth cone clutch surfaces 106a and 106d and the first and fourth mating cone clutch surfaces 108a and 108d).

Figure 5:
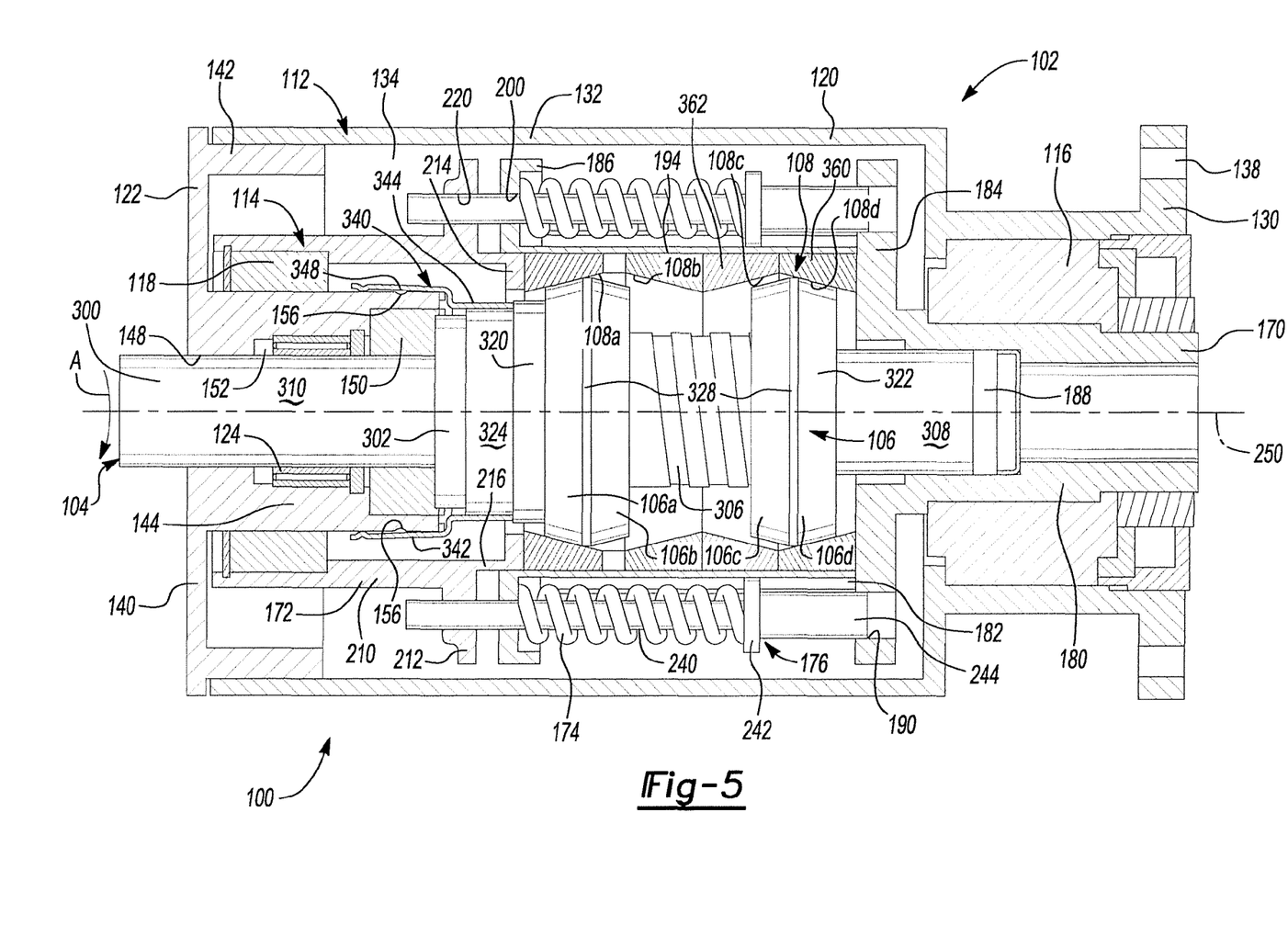
FIG. 5 is a section view similar to that of FIG. 4 but illustrating the torque transfer device in an torque limiting configuration.

It will be appreciated that the amount of torque that is transmitted through the torque transmitting device 100 is related to the axial load that is applied through the first and fourth cone clutch surfaces 106a and 106d. In situations where the amount of torque that is transmitted through the torque transmitting device 10 is relatively large, the relative rotation between the shaft member 300 and the nut 320 may continue until the nut 320 is abutted against the stop member 302. The structure 362 associated with the first mating cone clutch surface 108a can be driven axially away from the first interior housing member 170 against the force of the springs 174 as shown in FIG. 5. Translation of the structure 360 associated with the first mating cone clutch surface 108a can correspondingly translate the second interior housing member 172, which can pull the spring pins 176 in a direction which further compresses the springs 174.

Figure 6:
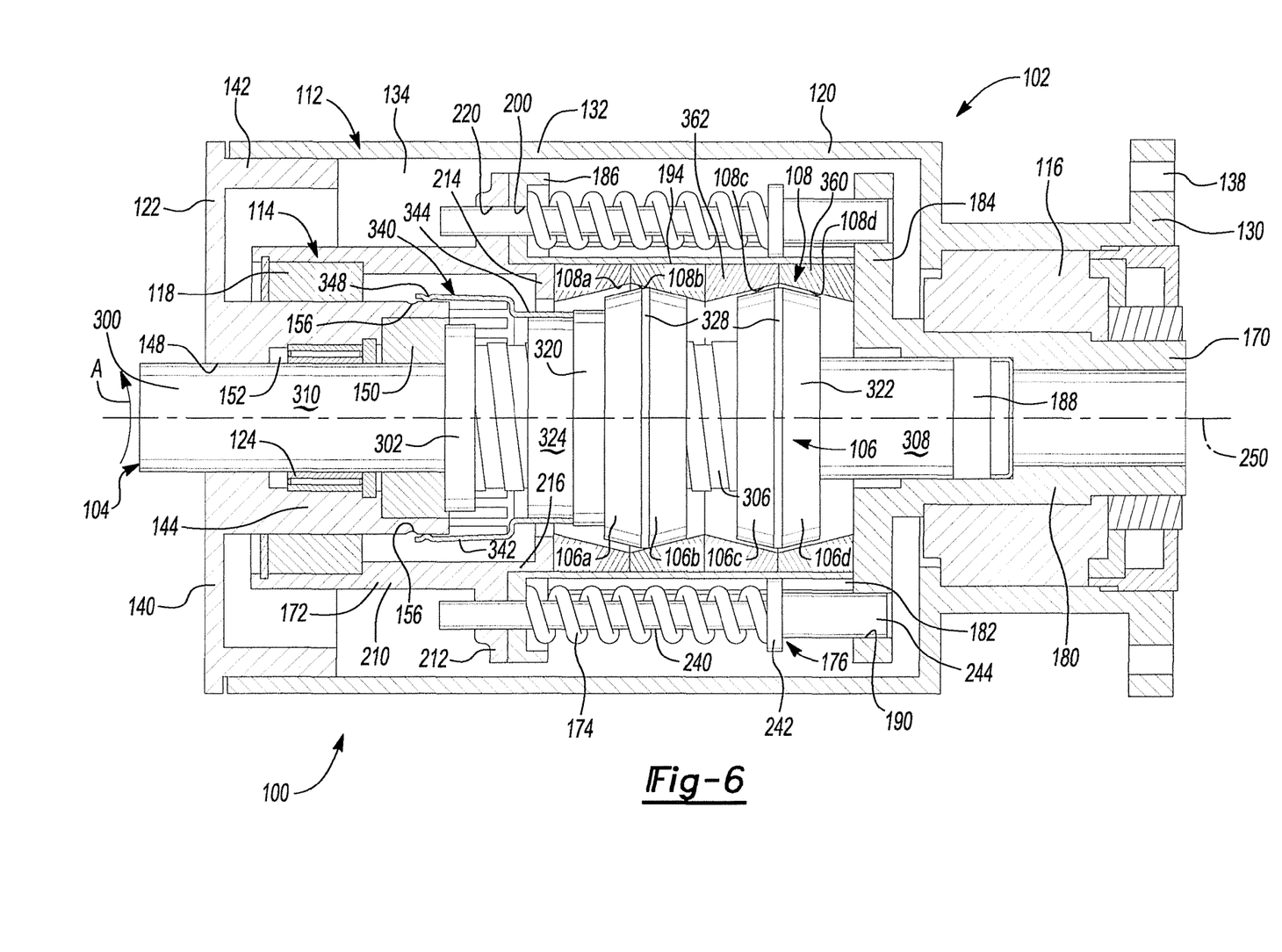
FIG. 6 is a section view similar to that of FIG. 2 but illustrating the torque transfer device in an intermediate configuration as power is applied in a second rotational direction.

When the direction of rotary power that is input to the shaft member is reversed, relative rotation between the shaft member 300 and the nut 320 will cause the nut 320 to translate toward the distal end segment 308 so that the second cone clutch surface 106b will contact the second mating cone clutch surface 108 as shown in FIG. 6.

Figure 7:
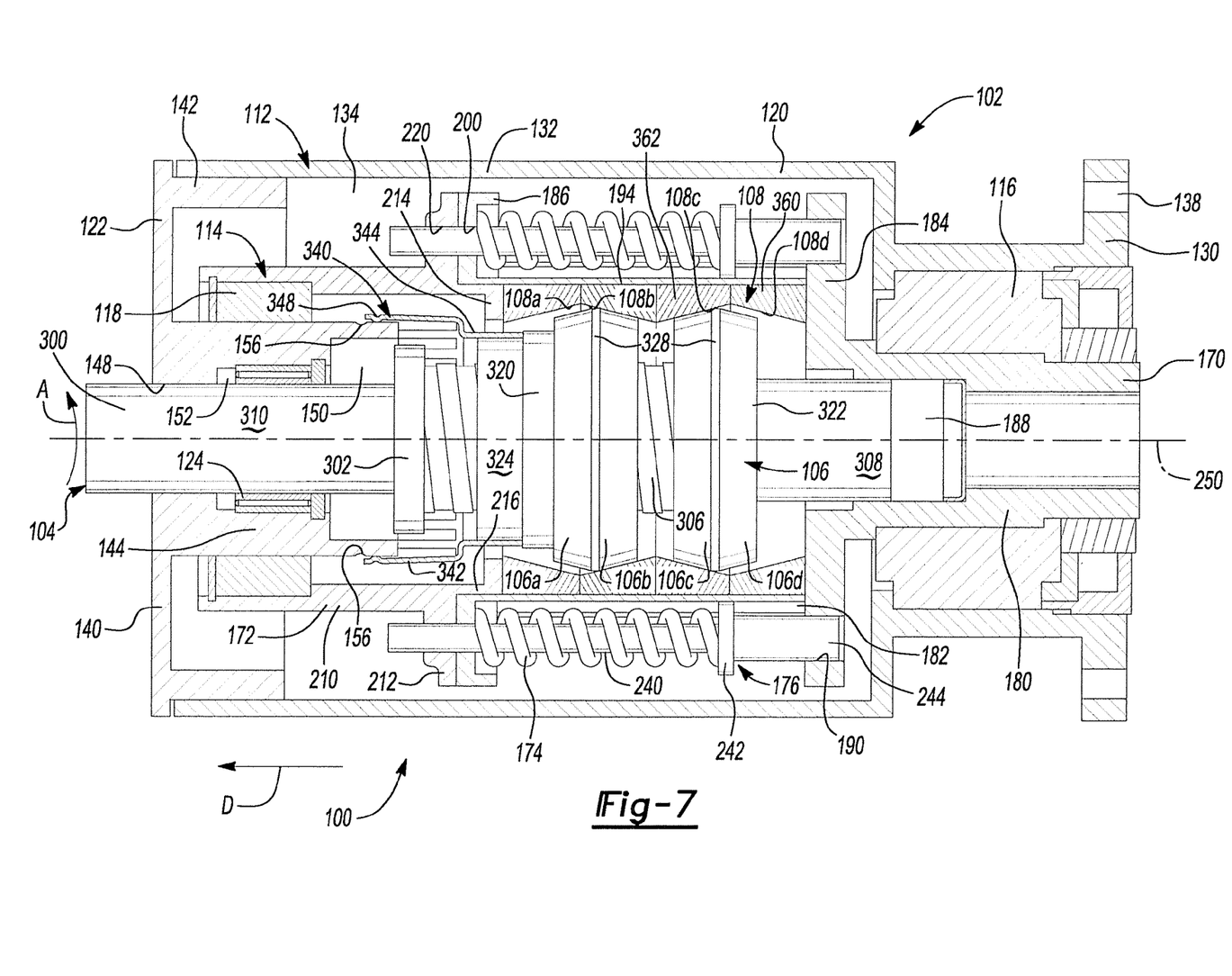
FIG. 7 is a section view similar to that of FIG. 6 but illustrating the torque transfer device in an engaged condition when power is applied in the second rotational direction.

Further rotation of the shaft member 300 in the rotational direction opposite the first rotational direction (i.e., the second rotational direction) causes the shaft member 300 to translate in the direction of arrow D to urge the third cone clutch surface 106c into engagement with the third mating cone clutch surface 108c as shown in FIG. 7. In this condition, rotary power can be transmitted in the second rotational direction between the shaft member 300 and the interior housing assembly 114 (via the second and third cone clutch surfaces 106b and 106c and the second and third mating cone clutch surfaces 108b and 108c).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle driveline comprising:
   a first driveline component;
   a second driveline component; and
   a torque transmitting device having:
   an input portion having a shaft with a thread formed thereon, the input portion being coupled for rotation with a rotatable power transmitting member of the first driveline component;
   an output portion coupled for rotation with a rotatable power transmitting member of the second driveline component, the output portion having a first case member, a second case member and an overload spring, the first case member being axially slidably but non-rotatably mounted on the second case member, the overload spring biasing the first and second case members toward one another;
   first and second cone clutch surfaces mounted on the thread on the shaft of the input portion, the first and second cone clutch surfaces being tapered in opposite directions; and
   first and second mating cone clutch surfaces received between the first case member and the second case member, at least one of the first and second mating cone clutch surfaces being axially slidably but non-rotatably coupled to the second case member, the first mating cone clutch surface being matingly engageable to the first cone clutch surface, the second mating cone clutch surface being matingly engagable to the second cone clutch surface.

2. The vehicle driveline of claim 1, wherein a stop member is formed on the shaft, the stop member inhibiting movement of at least one of the first and second cone clutch surfaces in a predetermined axial direction relative to the shaft beyond a predetermined location.

3. The vehicle driveling of claim 2, wherein the first and second cone clutch surfaces are integrally formed on a nut.

4. The vehicle driveline of claim 1, wherein the first case member includes an annular flange that abuts a structure onto which at least one of the first and second mating cone clutch surfaces is formed.

5. The vehicle driveline of claim 1, wherein the torque transmitting device further includes third and fourth cone clutch surfaces and third and fourth mating cone clutch surfaces, the third and fourth cone clutch surfaces being mounted on the shaft of the input portion, the third and fourth mating cone clutch surfaces received between the first case member and the second case member and being non-rotatably coupled to the second case member.

6. The vehicle driveline of claim 5, wherein the third and fourth cone clutch surfaces are non-movably coupled to the shaft.

7. The vehicle driveline of claim 6, wherein the torque transmitting device further includes a drag spring that engages a structure that is coupled to the first and second cone clutch surfaces.

8. The vehicle driveline of claim 7, wherein the overload spring comprises a plurality of spring elements that are disposed about the second case member.

9. The vehicle driveline of claim 8, wherein the first case member includes a housing and a plurality of pins, the pins being fixedly coupled to the housing, each of the spring elements being received over a corresponding one of the pins.

10. The vehicle driveline of claim 9, wherein each of the pins includes a pin flange and a guide portion, wherein each of the spring elements is received between a corresponding one of the pin flanges and a flange member formed on the second case member, and wherein each guide portion is slidably received in guide bore formed in the second case member.

11. A torque transmitting device comprising:
    an input portion having a shaft with a thread formed thereon, the input portion being adapted to be coupled for rotation with a rotatable power transmitting member of a first driveline component;
    an output portion adapted to be coupled for rotation with a rotatable power transmitting member of a second driveline component, the output portion having a first case member, a second case member and an overload spring, the first case member being axially slidably but non-rotatably mounted on the second case member, the overload spring biasing the first and second case members toward one another;
    first and second cone clutch surfaces mounted on the thread on the shaft of the input portion, the first and second cone clutch surfaces being tapered in opposite directions; and
    first and second mating cone clutch surfaces received between the first case member and the second case member, at least one of the first and second mating cone clutch surfaces being axially slidably but non-rotatably coupled to the second case member, the first mating cone clutch surface being matingly engagable to the first cone clutch surface, the second mating cone clutch surface being matingly engageable to the second cone clutch surface.

12. The torque transmitting device of claim 11, wherein a stop member is formed on the shaft, the stop member inhibiting movement of at least one of the first and second cone clutch surfaces in a predetermined axial direction relative to the shaft beyond a predetermined location.

13. The torque transmitting device of claim 12, wherein the first and second cone clutch surfaces are integrally formed on a nut.

14. The torque transmitting device of claim 11, wherein the first case member includes an annular flange that abuts a structure onto which at least one of the first and second mating cone clutch surfaces is formed.

15. The torque transmitting device of claim 11, wherein the torque transmitting device further includes third and fourth cone clutch surfaces and third and fourth mating cone clutch surfaces, the third and fourth cone clutch surfaces being mounted on the shaft of the input portion, the third and fourth mating cone clutch surfaces received between the first case member and the second case member and being non-rotatably coupled to the second case member.

16. The torque transmitting device of claim 15, wherein the third and fourth cone clutch surfaces are non-movably coupled to the shaft.

17. The torque transmitting device of claim 16, wherein the torque transmitting device further includes a drag spring that engages a structure that is coupled to the first and second cone clutch surfaces.

18. The torque transmitting device of claim 17, wherein the overload spring comprises a plurality of spring elements that are disposed about the second case member.

19. The torque transmitting device of claim 18, wherein the first case member includes a housing and a plurality of pins, the pins being fixedly coupled to the housing, each of the spring elements being received over a corresponding one of the pins.

20. The torque transmitting device of claim 19, wherein each of the pins includes a pin flange and a guide portion, wherein each of the spring elements is received between a corresponding one of the pin flanges and a flange member formed on the second case member, and wherein each guide portion is slidably received in guide bore formed in the second case member.

* * * * *